US006542646B1

(12) United States Patent
Bar-Yona

(10) Patent No.: US 6,542,646 B1
(45) Date of Patent: Apr. 1, 2003

(54) COMPUTERIZED IMAGE-PROCESSING METHOD

(75) Inventor: Itzchak Bar-Yona, Rosh Ha'Ayin (IL)

(73) Assignee: M. V. T. Multi Vision Technologies Ltd., Rosh Ha'Ayin (IL)

( * ) Notice: Subject to any disclaimer, the term of this patent is extended or adjusted under 35 U.S.C. 154(b) by 0 days.

(21) Appl. No.: 09/348,663

(22) Filed: Jul. 6, 1999

(30) Foreign Application Priority Data

Jul. 5, 1998 (IL) .................................. 125210

(51) Int. Cl.[7] .................................................. G06K 9/36
(52) U.S. Cl. ......................................... 382/284; 348/59
(58) Field of Search ................................ 382/284, 312; 348/51, 59; 358/401, 450

(56) References Cited

U.S. PATENT DOCUMENTS 3,764,979 A * 10/1973 Gabor .................. 340/146.3 P
5,100,330 A * 3/1992 Sekiguchi .................. 434/426
5,541,642 A * 7/1996 Ashbey ........................ 348/59
6,151,062 A * 11/2000 Inoguchi et al. ............... 348/51
6,278,480 B1 * 8/2001 Kurahashi et al. ............. 348/59

* cited by examiner

Primary Examiner—Yon J. Couso
(74) Attorney, Agent, or Firm—Oblon, Spivak, McClelland, Maier & Neustadt, P.C.

(57) ABSTRACT

A computerized method for creating a multi-image print for use with a dynamic display based on the relative periodic displacement of the multi-image print relative to a lenticular screen includes inputting, into a computer, data relating to a dynamic display and at least two basic images. The digital data of the images is used to set size and resolution of the images, thereby creating basic documents. The visual requirements of the basic documents including resolution, exposure time within a display cycle, and graphic characteristics are then determined. Each of the basic documents is divided into information units and is interlaced into a single document. The single document is processed to satisfy the data requirements, and the complex document is printed on a sheet to produce a multi-image print so that basic images will be alternatively displayed when the print is displaced relative to a lenticular screen.

11 Claims, 8 Drawing Sheets

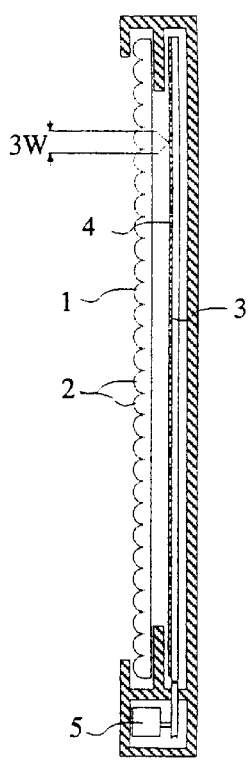
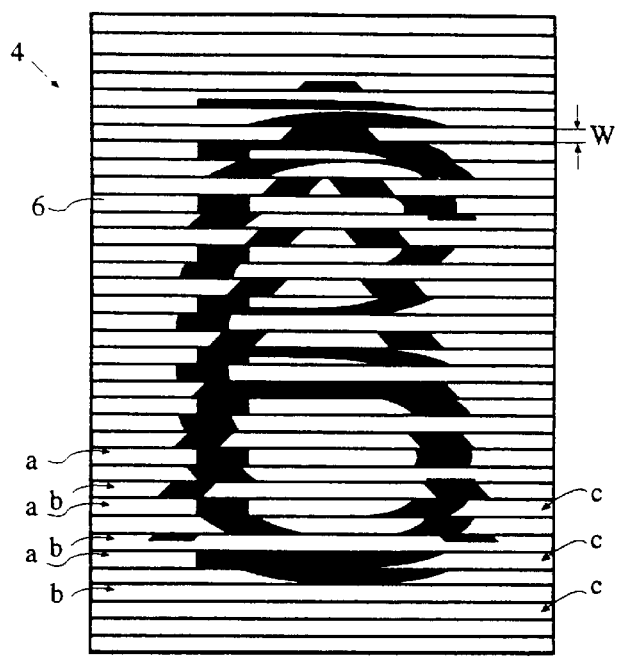
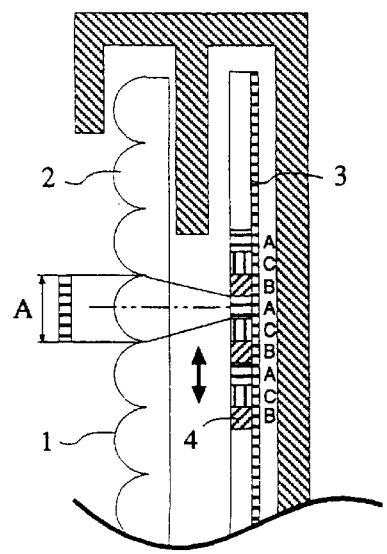
Fig.1
Fig.2
Fig.3

COMPUTERIZED IMAGE-PROCESSING METHOD

FIELD OF THE INVENTION

The present invention relates to a computerized image-processing method for multi-image display devices, especially dynamic ones.

BACKGROUND OF THE INVENTION

The per se known multi-image display devices consist of a planar, lenticular screen behind which, in a plane parallel to the screen, there is arranged a lithograph prepared from at least two different images, which appear alternatively to a stationary viewer whenever the position of the print is altered relative to the screen.

Methods for preparing such prints exist and are described, e.g., in U.S. Pat. Nos. 5,100,330 and 5,488,451. The prior art methods, however, are very limited. When different kinds of displays are required, such as dynamic billboards, for example, these methods are not suitable. Also, these prior art methods are generally designed for a definite product, and are mostly limited to small, passive-type devices, as opposed to dynamic displays.

Therefore, it is an object of the present invention to provide a custom-made, versatile method for preparing an image, said method being capable of: (a) inputting a comprehensive data base of any given dynamic display, including its dimensions, the form and arrangement of its lenses and its location in relation to the major viewing angles; (b) inputting a given number of basic images; (c) determining visual requirements, including resolution of the final images to be displayed, the exposure time of each image within a complete display cycle, graphic motion, 3-D and animation effects; and (d) processing the images of step (b) according to steps (a) and (c), in order to achieve a custom-made print ideally fitting the given particular display.

Another object of the present invention is to overcome several drawbacks which are inherent in the per se known methods, and to provide a satisfactory presentation of alternating images within a large range of sizes for dynamic displays, from a few square centimeters to large billboards of several dozen square meters. Such large presentations involve a wide extent of viewing angles which should be free of parallax distortion, and satisfactory resolution, relatively independent of the size of the lenses.

A further object of the method according to the present invention is to provide the producer with on-line editing means including a computer monitor simulation similar to the actual display presentation. Such means enables the producer to create animation of cartoon figures; unique, colorful patterns in motion, and other different visual effects that require an on-line simulation step.

SUMMARY OF THE INVENTION

In accordance with the present invention, there is thus provided a computerized method for creating a multi-image print to be utilized with a dynamic display based on the relative periodic displacement of said multi-image print relative to a lenticular screen, said method comprising the steps of (a) inputting into a computer data relating to said dynamic display, including its dimensions, form, lens characteristics and viewing angles; (b) inputting the digital data of at least two basic images to be displayed and setting the size and resolution of said images to create basic documents; (c) determining the visual requirements of said basic documents relating to resolution, the exposure time of each image within a complete display cycle, and graphic characteristics; (d) dividing each of said basic documents into small information units and interlacing said units into a single complex document; (e) processing said complex document to meet the data and requirements of steps (a) and (c), and (f) printing the complex document on a sheet to produce a multi-image print, so that when said print is displaced relative to a lenticular screen, said basic images will be alternatively displayed.

The invention further provides a computerized method for creating a multi-image print to be utilized with a dynamic display based on the relative periodic displacement of said multi-image print relative to a lenticular screen, said method comprising the steps of (a) inputting the digital data of at least two basic images to be displayed and setting the size and resolution of said images to create basic documents; (b) inputting into a computer data relating to said dynamic display, including its dimensions, form, lens characteristics and viewing angles; (c) determining the visual requirements of said basic documents relating to resolution, the exposure time of each image within a complete display cycle, and graphic characteristics; (d) dividing each of said basic documents into small information units and interlacing said units into a single complex document; (e) processing said complex document to meet the data and requirements of steps (b) and (c), and (f) printing the complex document on a sheet to produce a multi-image print, so that when said print is displaced relative to a lenticular screen, said basic images will be alternatively displayed.

The invention still further provides a computerized method for creating a multi-image print to be utilized with a dynamic display based on the relative periodic displacement of said multi-image print relative to a lenticular screen, said method comprising the steps of: (a) inputting the digital data of at least two basic images to be displayed and setting the size and resolution of said images to create basic documents; (b) determining the visual requirements of said basic documents relating to resolution, the exposure time of each image within a complete display cycle, and graphic characteristics; (c) inputting into a computer data relating to said dynamic display, including its dimensions, form, lens characteristics and viewing angles; (d) dividing each of said basic documents into small information units and interlacing said units into a single complex document; (9e) processing said complex document to meet the data and requirements of steps (b) and (c), and (f) printing the complex document on a sheet to produce a multi-image print, so that when said print is displaced relative to a lenticular screen, said basic images will be alternatively displayed.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental under-standing of the invention, the description taken with the drawings making apparent to those skilled in the art how the several forms of the invention may be embodied in practice.

In the drawings:

FIG. 1 is a schematic, cross-sectional view of a representative embodiment of a dynamic display device;

FIG. 2 illustrates a print prepared according to the invention, comprising several basic images;

FIG. 3 is an enlarged, cross-sectional detail of FIG. 1;

FIG. 4 is a flow diagram illustrating the steps of preparing a multi-image print according to the present invention;

FIGS. 5a–5c illustrate steps $V_2$ and $V_3$ of FIG. 4;

FIG. 6 is a graphic representation illustrating different angles of viewing a display device;

FIGS. 7a–7c illustrate the replicating step $V_5$;

FIGS. 8–12 illustrate the compressing and filling step $V_6$;

FIG. 13 illustrates the tilting step $V_7$;

FIG. 14 shows an alternate order of steps according to the present invention;

FIGS. 15 and 15a show the method according to the present invention for producing a multi-image print to be utilized with spherical lenses, and FIG. 16 is a graphic display of spherical lenses arranged on a 90° grid.

DETAILED DESCRIPTION OF PREFERRED EMBODIMENTS

Figure 4:
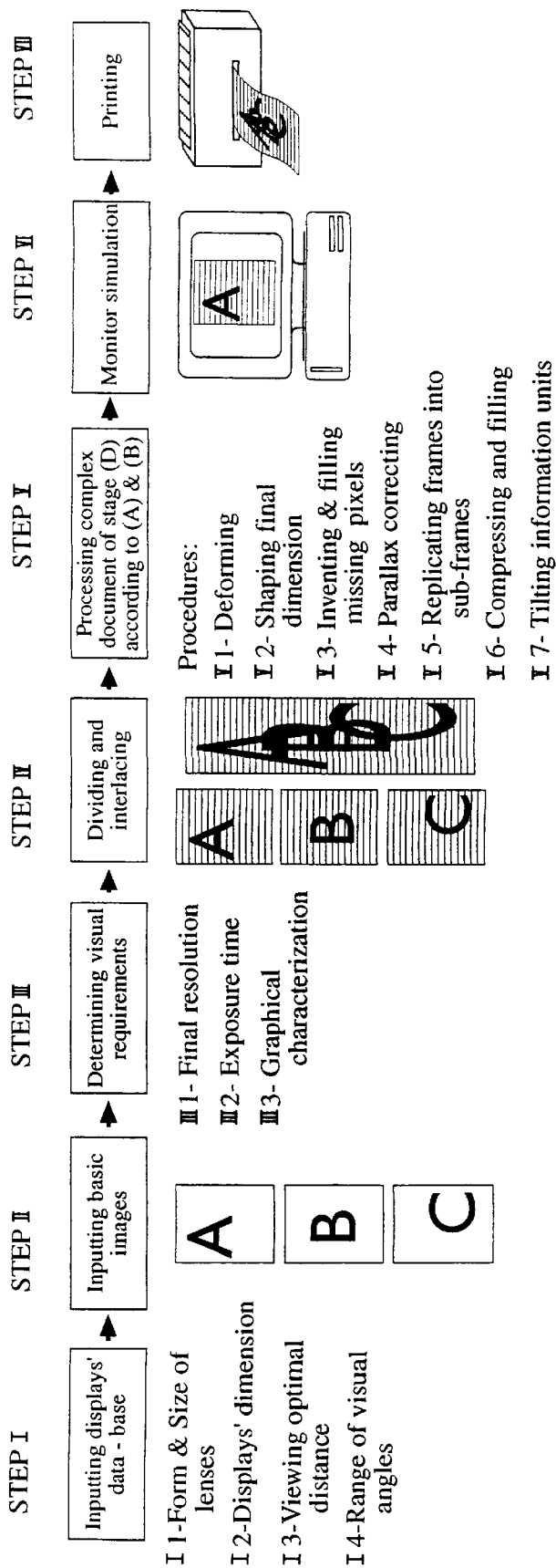

Referring now to the drawings, there is seen in FIG. 1 a vertical cross-section of a representative dynamic display device, comprising a screen made of linear lenticular lenses 2. The thickness of screen 2 is somewhat less than the focal length of an individual lens. Disposed behind screen 2 is a lightweight sheet 3, carrying a complex print 4 on its surface facing the screen, and an electric motor 5, located at the lower part of the device, effects a periodic displacement of sheet 3 relative to lenses 2.

The particular print of the example shown in FIG. 2 is a composite of the images of the letters A, B and C. Each image, in this case an alphabet letter, is represented by a plurality of strip-like frames 6 forming a raster, each frame carrying information related to the image of which it represents a particular part. As can be seen in FIG. 1, strip frame of a width W is enlarged to a width 3W, filling the width of an entire lens. FIG. 3 is an enlarged detail of FIG. 2, in which the sequential arrangement of frames 6 is clearly visible. Upon looking at the display device (FIG. 2) in a substantially perpendicular direction, all of the lenses will be filled with the enlarged image of frames which, in their totality, represent the letter B; displacing sheet 3 in a downwards direction will reveal the letter C, all of the lenses being filled with the enlarged images of frames c; and further displacement of sheet 3 will fill all lenses with the enlarged images of frames a, revealing the image of the letter A.

The following is a detailed description and explanation of the method of producing such an image-carrying sheet 3, as shown in the flow diagram of FIG. 4.

Step I relates to geometrical data of the display device. It consists of inputting into the computer's memory the following data:

$I_1$ Dimensions, i.e., width and height, of the display;

$I_2$ Shape and size of the lenses, e.g., cylindrical or spherical, and the lens arrangement pattern, e.g., in a linear, rectangular or hexagonal grid;

$I_3$ Optimal viewing distance (a factor which will be described in detail hereinafter), and $I_4$ the range of visual angles from which the device is to be view.

Step II comprises the inputting of the two or more basic images. Such images can be either scanned from existing photographs taken by a digital camera, or graphically built in the computer.

Step III comprises determining and inputting the final visual requirements:

$III_1$ resolution of the display images with reference to the display dimensions and graphic requirements;

$III_2$ exposure time of each image, including the transition time between consecutive images, and $III_3$ graphic characteristics of the entire display.

Step IV comprises:

$IV_1$ dividing each basic image (Step II) into independent information frames corresponding to the number, size and shape of screen lenses; and $IV_2$ interlacing the frames into a single complex image document.

Step V comprises a digital processing of the complex image document containing the information of Steps I, II and III, according to the following procedure:

$V_1$ deforming the complex image document by changing its proportions, either by stretching or compressing it, to proportions substantially equal to those of the basic images of Step II. For example, the complex image document can be stretched 3 times in the X (horizontal) axis, or compressed to ⅓ of its height in the Y (vertical) axis. The first choice proves to be better, especially when large screens are involved, because none of the information will be lost, while compressing implies a certain loss of colored pixels, and $V_2$ shaping the final dimensions of the complex image document to proportions similar to those of the display screen, and magnifying the complex image to its full size. If the final image sheet is to be large, the very act of magnifying it will cause a deleting effect.

Figure 5A:
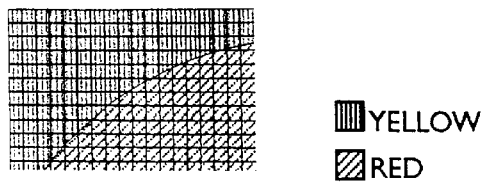
Figure 5B:
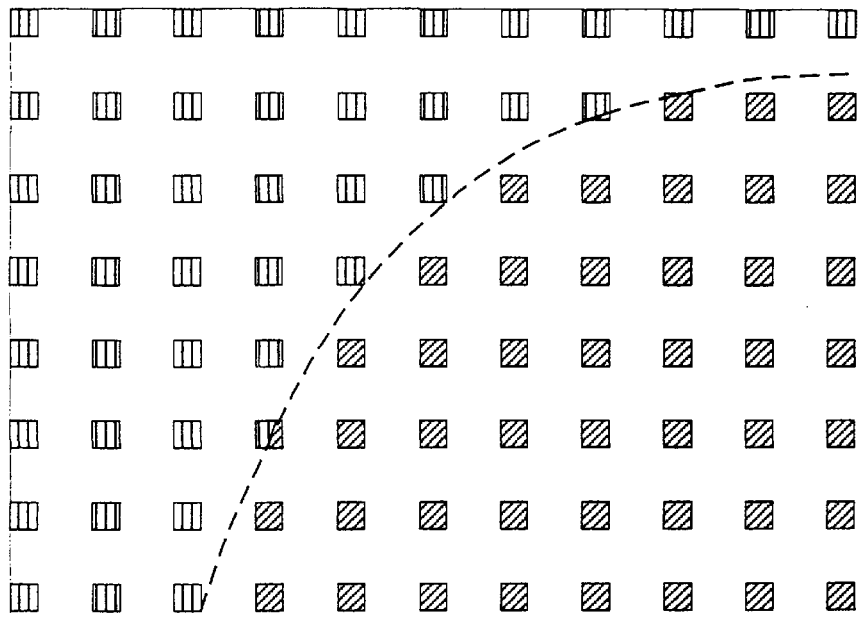
Figure 5C:
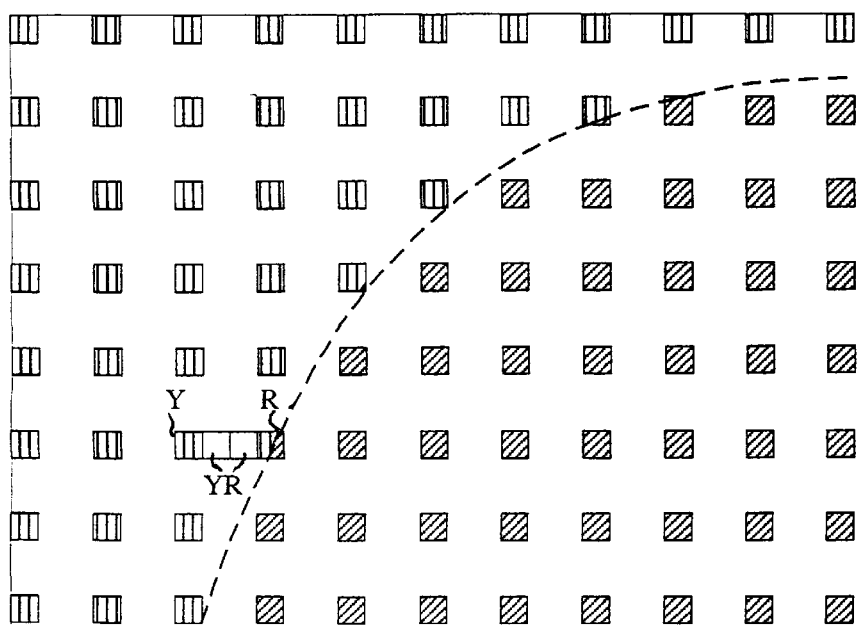

FIG. 5a demonstrates a partial pattern of the complex document, comprising the two colors yellow and red. FIG. 5b shows the magnified document in its final dimensions for use in, e.g., a large billboard. The red and yellow pixels are now clearly seen to be spaced apart. The determination of the final resolution in Step $III_1$ means deciding to what extent these empty spaces should be filled in. FIG. 5c actually describes Step $III_1$, in which missing pixels are created and filled-in. Two adjacent pixels, one yellow and one red, now spaced-apart, will be filled in by two newly created pixels, forming an orange color. Such a procedure involves the mathematical calculation and interpolation of adjacent pixels. The final print has to be cost-effective, meaning that when a large print is involved, a low resolution will suffice in order to save printing costs, materials, processing and printing time, and vice-versa, when accurate images are necessary.

Figure 6:
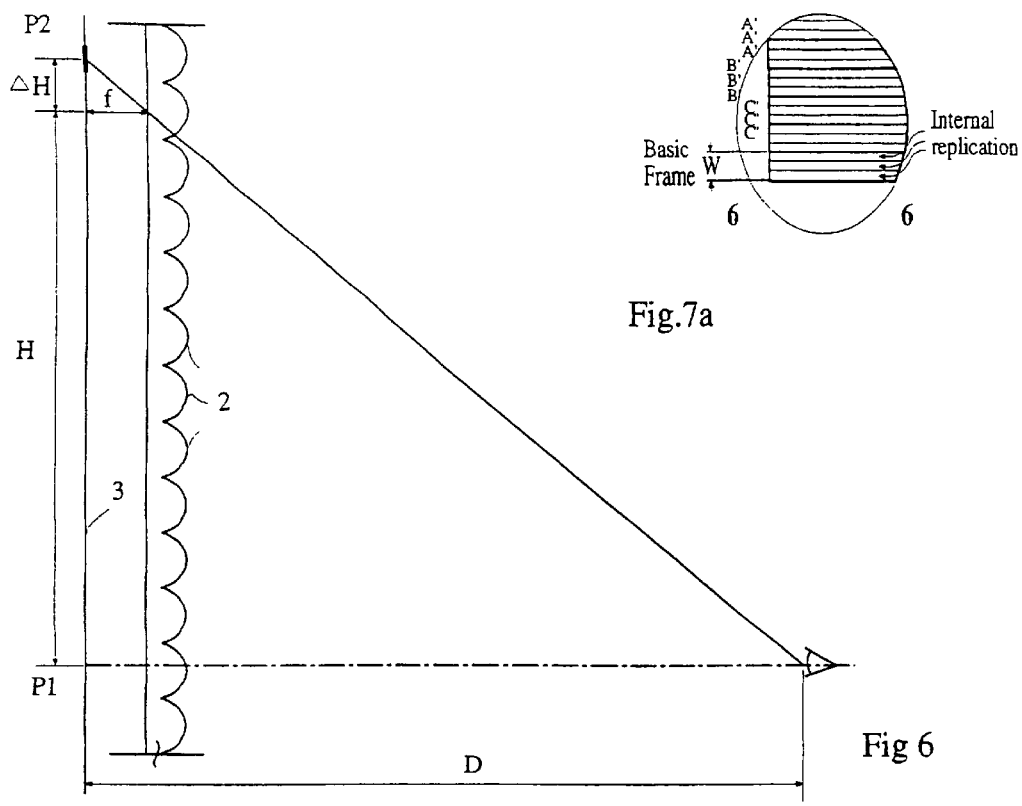

The next Step $V_4$ deals with parallax correction, necessary mainly for preparing images of relatively large dimensions. Prior art methods are based on the assumption that a display is viewed in a direction substantially perpendicular to the raster plane. While this assumption may be regarded as being valid for postcard-sized displays, it is definitely wrong as far as larger displays are concerned, that is, displays larger than about 40 cm in height. In order to better explain, reference is now made to FIG. 6, which represents a display device having an array of lenses 2 and a sheet 3 containing three images, similar to the multi-image sheet of FIG. 2. The eye of an observer is located at a distance D from sheet 3, and looks at point $P_1$ of a given image, e.g., of the letter A, in a direction substantially perpendicular to the device. However, the higher the observer raises his eyes (or the more he lowers his eyes), the more is what he sees affected by parallax; i.e., the more the observer is likely to see frames of a different basic image, e.g., letter B or even letter C. If the distance from sheet 3 to the rear surface of the lens array is f, and the height of sheet 3 after the interlacing step is 2H (assuming that the center of sheet 3 is at eye level), the parallactic shift is $$\Delta H = \frac{fH}{D - f}.$$

As f is mostly rather small relative to the distance D, it can be neglected, resulting in a definitely useful approximation $$\Delta H = \frac{fH}{D}.$$

A second permissible approximation is based on the assumption that the parallactic shift increases linearly from point $P_1$ to point $P_2$, while strictly speaking, this shift is a trigonometric function of the angle included between the ray from a given lens 2 to the observer's eye, and the horizontal. However, even for the uppermost point $P_2$, this angle rarely exceeds 15°, at which magnitude the tangent curve still approximates a straight line.

Feeding the computer the numerical values of distances D and f as well as H, ΔH for H=50 cm, D=200 cm and f=8 cm, is computed as $$\frac{50 \times 8}{200} = 2 \text{ cm.}$$

The stretching required to turn H into H+ΔH, is then computed as $$\frac{\Delta H + H}{H} = 1.04,$$

that is, for the entire height 2H, a stretch of 8%, to be carried out in Step $V_4$.

While it is obviously impossible to know beforehand the exact position of the viewers relative to the display unit, optimal viewing distances in, for example, shopping centers or railway stations, can be determined to obtain satisfactory images over a reasonable range of viewing distances.

Step $V_5$ of FIG. 4 is a procedure providing the producer with an important control over the exposure time of each image relative to the complete cycle time of the three images. This will now be explained with reference to FIGS. 7a–7c.

Figure 7A:
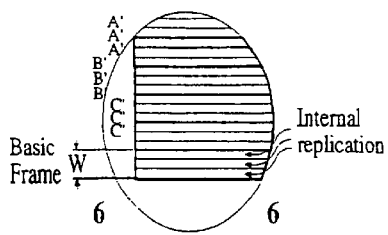

FIG. 7a shows an enlarged detail of the complex image document as process in Step V. The original frame of width W has been compressed to a width of W/3 and then internally replicated three times to occupy the original width W. The newly created document now comprises sub-frames representing the original images A, B, C, in the order A', A', A', B', B', B', C', C', C', wherein A' represents a sub-frame of image A, etc.

Figures 7B, 7C:
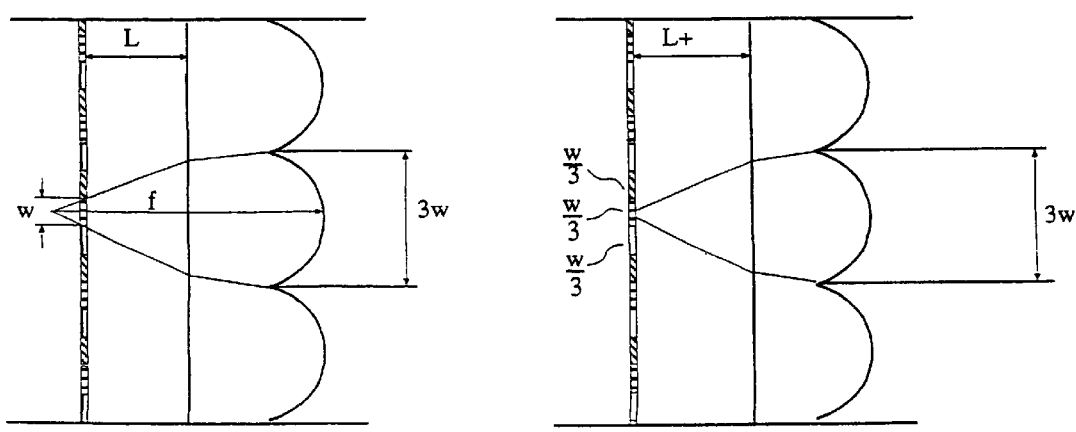

In order to project a clear image on the display device, the distance between the multi-image print and the lenticular screen has to be increased. FIG. 7b shows the original distance L when a frame of width W is projected as a magnified one having the width 3W. In FIG. 7c, sub-frames of width W3 have to be projected to the full scale of 3W. Such a requirement implies spacing the multi-image print at a longer distance L+. This step is important in solving the problem of a serious drawback of known methods: being displaced from image A to B and C, each lens also magnifies bordering areas between two adjacent frames, resulting in a very short exposure time for each clear image, while the dissolving time between images is considerably longer.

Processing the document according to the above-described procedure results in the projection of each image several times before the next image is projected. The observer's eye smoothes out the passages between the consecutive projections of the sub-frames belonging to a given image, and the final result is that the exposure of a clear image is extended, while the dissolving time between images is minimized. This step enables the producer to also determine an asymmetric exposure time for the images. For example, out of 9 sub-frames creating the basic total cycle, only 2 sub-frames can contain image A; 2 sub-frames contain image C, leaving 5 sub-frames to image B, which, in advertising displays, might be the main message to be viewed.

Clearly, the number of replications is limited by the resolving power of the printer used to print the complex image and the processing power of the computer, but from 2 to 5 replications should suffice to achieve reasonably long dwelling, and reasonably short transition periods.

Step $V_6$ relates to the range of visual angles measured in the horizontal plane. From the previous description it is clear that the multi-image sheet has to be held at a precise distance L from the lenses. Shortening the distance L results in projecting neighboring frames of adjacent images. Increasing the distance L results in only a partial projection of each frame. In both cases, an unclear image appears on the screen. Such a fundamental requirement enables a very limited horizontal range of viewing angles: for a viewer standing outside the area, distortion of the images takes place, such as the one caused by increasing the distance L dimension, described above. Step $V_6$ is therefore aimed at overcoming this drawback, and will now be described with reference to FIGS. 8–12.

Figure 8:
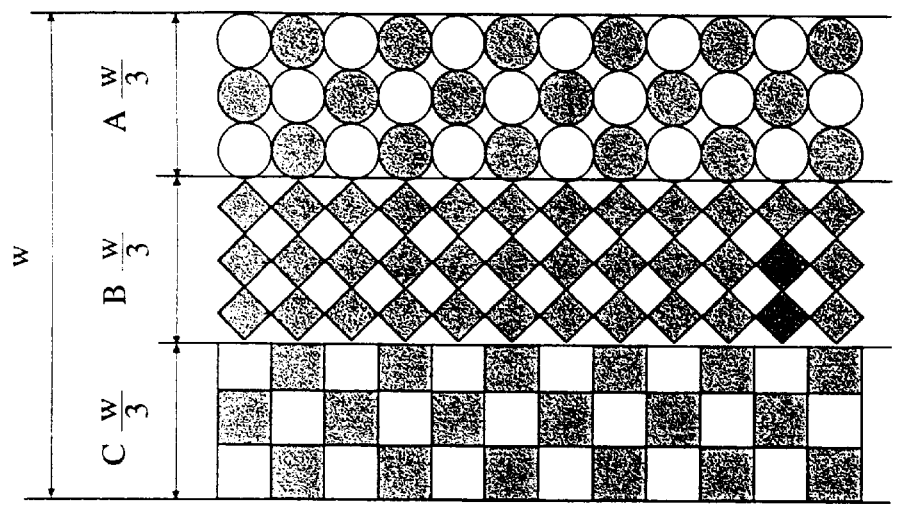
Figure 9:
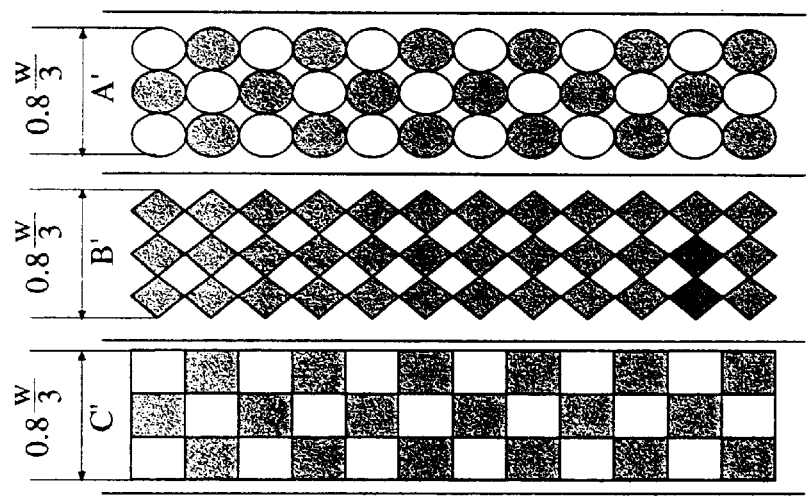

FIG. 8 shows, in an enlarged scale, three adjacent frames of the prepared complex image document. Each of the frames A, B and C have a width of W/3. FIG. 9 shows the same frames as being further compressed, at a rate of, e.g., 0.8 (80%). The compressed frames are designated A'; B', C'.

Figure 10:
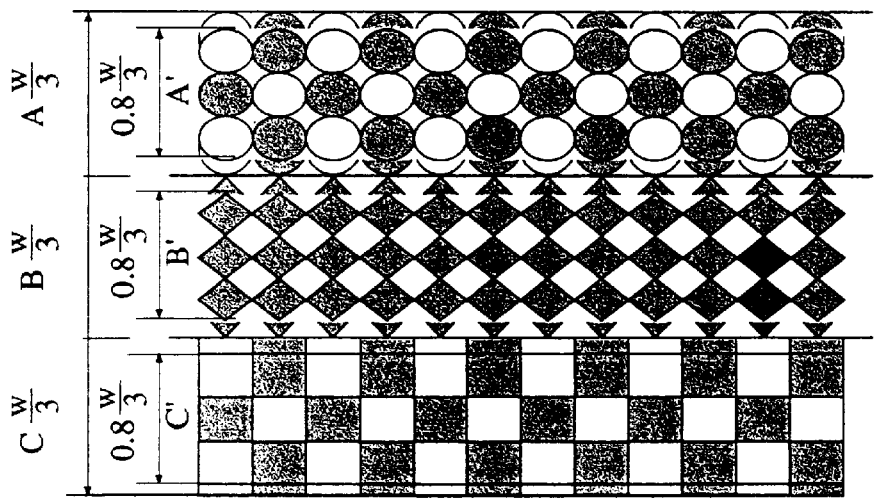
Figure 11:
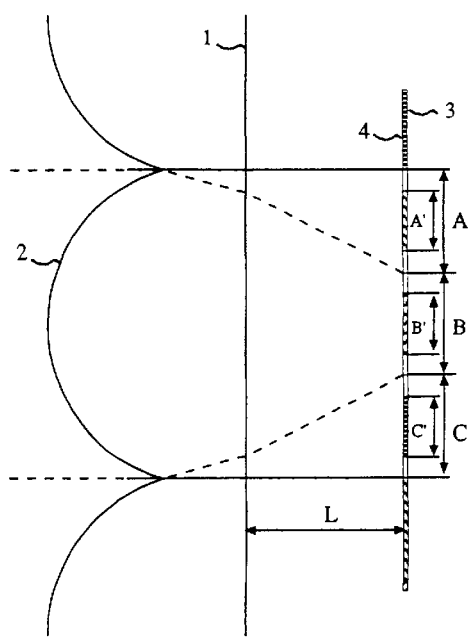

FIG. 10 shows a superposition of the frames of FIGS. 8 and 9, wherein the frame of FIG. 9 partially overlaps the frame of FIG. 8. The new, complex image is slightly inferior to a substantially perpendicular view, but displays an extended range of angular viewing, as will become clear from FIGS. 11 and 12. FIG. 11 shows, in cross-section, lenticular screen 1 and lenses 2 spaced at a distance L from the multi-image print 4 on screen 3, bearing the multi-image containing the frames of FIG. 9. FIG. 11 illustrates the optical magnifying effect when the screen is observed perpendicularly: on the lens 2 of screen 1 will be magnified frame B' and marginal areas above and below frame B'. A full image of the letter B will be displayed, although slightly distorted.

Figure 12:
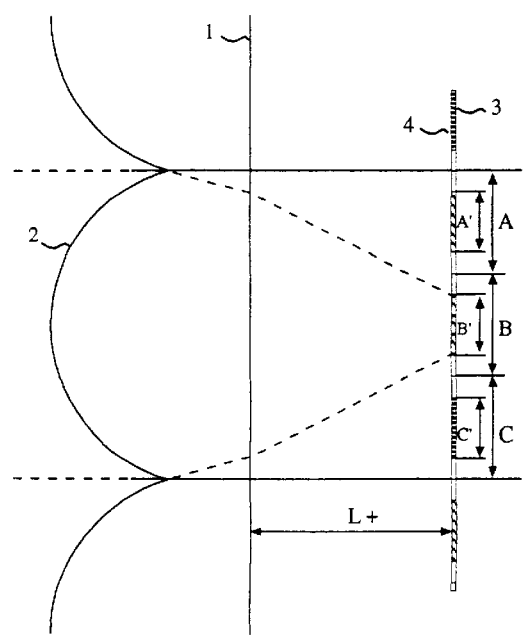

FIG. 12 illustrates the same display with screen 1 and multi-image print 4, when observed from an angle not perpendicular to the screen, but rather smaller or larger. For such a line of sight, the relevant distance between screen and print will be L+, which is greater than L, as described hereinbefore with reference to FIG. 6. What is now fully magnified and projected on the screen is the compressed frame B' only (width=0.8×W/3). Thus, a perfect image of the letter B will be displayed on the screen. The complex multi-image print obtained shows a minor, acceptable distortion when viewed perpendicularly, having an increased range of good quality viewing angles.

While a complex, multi-image sheet processed without the steps of the above-described procedure is limited, in the case of a billboard display, to about 90°, improved multi-image sheets processed according to Step $V_6$ exhibit a satisfactory image within the range of 120°. Such processing is generally essential in outdoor displays, when a wide range of angles is required. This step can be implemented before or after Step $V_5$.

Figure 13:

Step $V_7$ is optional, and consists of imparting to the background of the information frames, but not to the main information contained therein, a slight tile from the horizontal of about 3°–5°, as shown in FIG. 13. Adding a graphic message (e.g., "Got milk?") on top of the background of the tilted pattern will cause the letters to appear to float, and the background to recede. A combination of frames tilted in several directions can serve as a basis for creating amazing effects.

Step VI of FIG. 4 consists of simulating the complex document resulting from Step V on the computer monitor. The computer imitates the alternation of any dynamic display, also creating the dissolving effect typical of the method. Such simulation is an important editing tool, especially when animated figures are displayed.

In FIG. 4, the different steps of the method are described as taking place in an order from I to VI. It should be realized that the method according to the present invention is not limited to such an order, although it is assumed to be most friendly and efficient.

Figure 14:
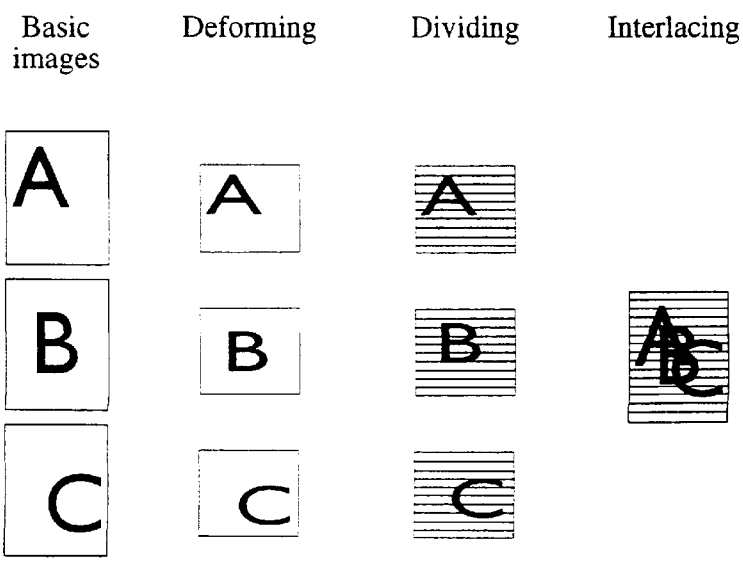

FIG. 14 discloses a slightly different order. For example, Step IV can be altered, as follows:

Three basic images A, B and C are deformed (Step $V_1$) before dividing and interlacing (Step IV). In such a case, the complex document produced will have proportions similar to those of the basic images. The other steps in the processing procedure will continue without change.

It is also obvious that Step III can follow Step I before inputting the images of Step II.

Figures 15, 15A:
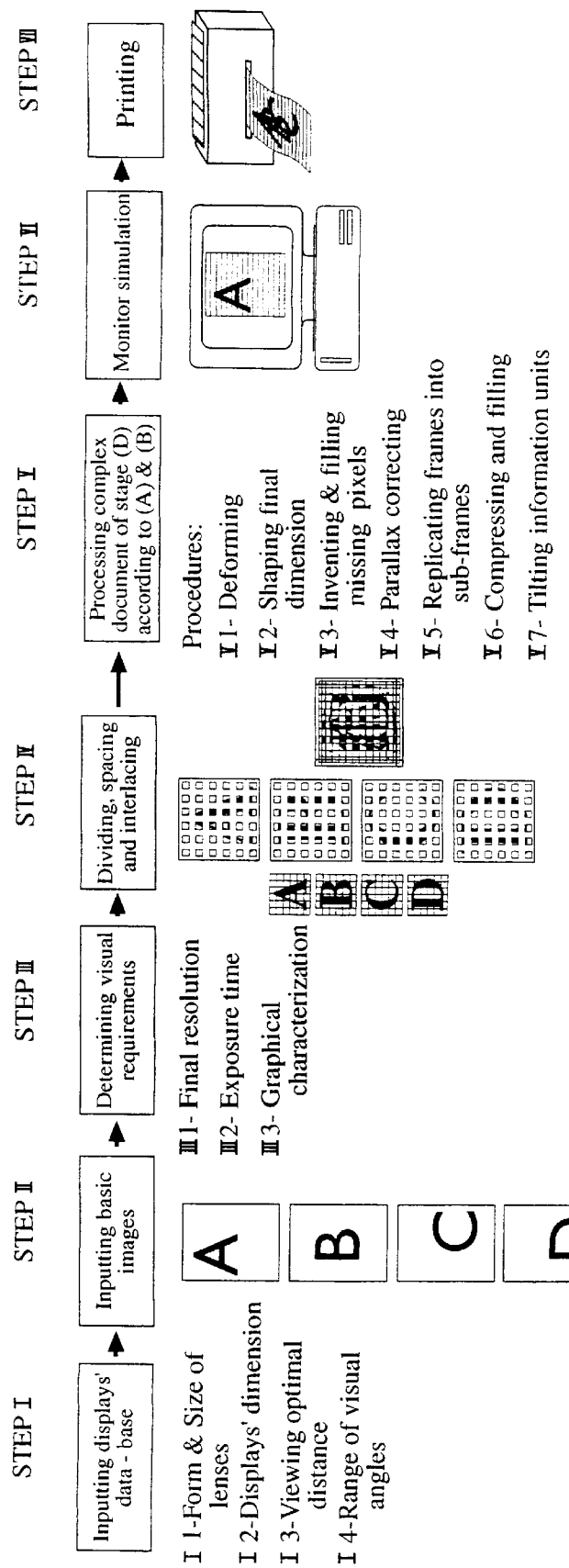

FIG. 15 is a flow diagram similar to FIG. 4, illustrating the production of a complex display for a device having spherical lenses. Steps I to III and V to VII are similar to those described above with reference to FIG. 4. In Step IV, the images are divided into rectangular information units (instead of strip-like frames), and then spaced apart to assume a dimension of 4 times larger than the dimension of each individual basic image. The spaced-apart images are interlaced, shifting each basic image and resulting in a compact pattern comprising all four basic images.

FIG. 15a illustrates an enlarged portion of the complex, interlaced document of FIG. 15, showing the arrangement of basic information elements. The steps of Step V will proceed as follows:

$V_1$ deformation will occur in both the X and Y axes. The final dimensions of the document must fit the screen size and the arrangement of lenses.

Figure 16:
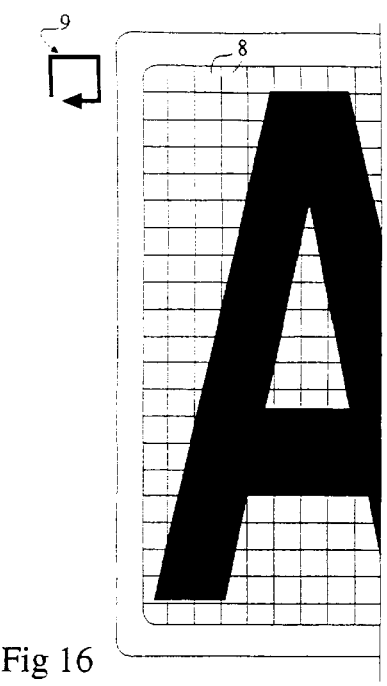

$V_2$ similar to $V_2$ of FIG. 4;

$V_3$ similar to $V_3$ of FIG. 4;

$V_4$ similar to $V_4$ of FIG. 4, however, the stretching according to the formula is executed both horizontally and vertically;

$V_5$ is irrelevant to this embodiment;

$V_6$ is also similar to $V_6$ of FIG. 4. The superpositioning here will be between compressed rectangular elements, rather than linear frames; and $V_7$ is illustrated in FIG. 16, showing the display of spherical lenses 8 arranged on a 90° grid. Displacing the image is done in a rectangular "track" represented by the arrow 9. In this case, a tilting of the basic information images about their axes will cause no interesting effects; a tilting of line, either horizontal or vertical, of information units will cause the effects described with reference to FIG. 13.

Finally, it should be noted that the method described herein is not limited to rectangular grids, but hexagonal, honeycomb-like grids may also be used, and with some adaptation, the method of the present invention may be applied to any lens arrangement by following the basic steps described herein.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A computerized method for creating a multi-image print to be utilized with a dynamic display based on the relative periodic displacement of said multi-image print relative to a lenticular screen, said method comprising the steps of:

a) inputting into a computer data relating to said dynamic display, including its dimensions, form, lens characteristics and viewing angles;

b) inputting the digital data of at least two basic images to be displayed and setting the size and resolution of said images to create basic documents;

c) determining the visual requirements of said basic documents relating to resolution, the exposure time of each image within a complete display cycle, and graphic characteristics;

d) dividing each of said basic documents into small information units and interlacing said units into a single complex document;

e) processing said complex document to meet the data and requirements of steps (a) and (c), and f) printing the complex document on a sheet to produce a multi-image print, so that when said print is displaced relative to a lenticular screen, said basic images will be alternatively displayed.

2. A computerized method for creating a multi-image print to be utilized with a dynamic display based on the relative periodic displacement of said multi-image print relative to a lenticular screen, said method comprising the steps of:

a) inputting the digital data of at least two basic images to be displayed and setting the size and resolution of said images to create basic documents;

b) inputting into a computer data relating to said dynamic display, including its dimensions, form, lens characteristics and viewing angles;

c) determining the visual requirements of said basic documents relating to resolution, the exposure time of each image within a complete display cycle, and graphic characteristics;

d) dividing each of said basic documents into small information units and interlacing said units into a single complex document;

e) processing said complex document to meet the data and requirements of steps (b) and (c), and f) printing the complex document on a sheet to produce a multi-image print, so that when said print is displaced relative to a lenticular screen, said basic images will be alternatively displayed.

3. A computerized method for creating a multi-image print to be utilized with a dynamic display based on the relative periodic displacement of said multi-image print relative to a lenticular screen, said method comprising the steps of:

a) inputting the digital data of at least two basic images to be displayed and setting the size and resolution of said images to create basic documents;

b) determining the visual requirements of said basic documents relating to resolution, the exposure time of each image within a complete display cycle, and graphic characteristics;

c) inputting into a computer data relating to said dynamic display, including its dimensions, form, lens characteristics and viewing angles;

d) dividing each of said basic documents into small information units and interlacing said units into a single complex document;

e) processing said complex document to meet the data and requirements of steps (b) and (c), and f) printing the complex document on a sheet to produce a multi-image print, so that when said print is displaced relative to a lenticular screen, said basic images will be alternatively displayed.

4. The method according to any one of claims 1, 2 or 3, comprising the steps of:

g) performing steps (a) to (c) in any selected order; and h) processing said complex document to meet the data requirements of step (g); and i) dividing each of said basic documents into small information units and interlacing said units into a single, complex document.

5. The method according to any one of claims 1 to 4, further comprising the step of:

j) on-line simulation of the display images, while editing said complex document.

6. The method according to any one of claims 1–3, wherein said lenticular screen includes linear cylindrical lenses and said information units are linear frames substantially of the same shape and size as said lenses.

7. The method according to any one of claims 1–3, wherein said lenticular screen includes an array of rectangular lenses arranged in any polygonal grid, and said information units are polygons of substantially the same size and configuration.

8. The method according to any one of claims 1, 2 or 3, wherein, in order to determine the exposure time of each image, there are provided the further steps of compressing each of said information units to a predetermined fraction of their non-compressed width, and replicating each of said information units as compressed to produce a number of identical information sub-units, each sub-unit containing the entire information of said information unit, and the collective width of said sub-units being equal to the non-compressed width of the information unit from which they were compressed.

9. The method according to any one of claims 1, 2 or 3, further comprising the step of creating graphic effects on said complex document by imparting a tilt to the outlines of said information units, while retaining the original orientation of the information contained in said units.

10. The method according to any one of claims 1, 2 or 3, wherein, in order to compensate for a parallax effect, there is provided the further step of stretching said complex document to a measure determined by its dimensions and the optimal distance at which the display is viewed by an observer.

11. The method according to any one of claims 1, 2 or 3, wherein, in order to improve the range of viewing angles, there are provided the further steps of creating a second complex document from said original complex document by compressing each of said information units to a predetermined fraction of their non-compressed width, and superposing said second complex document over the original complex document to obtain a third complex document wherein the central area of each information unit is occupied by compressed units of said second complex document, and the remaining marginal areas contain the non-compressed information of the original information units.

* * * * *